United States Patent [19]

Kono et al.

[11] Patent Number: 5,164,290

[45] Date of Patent: Nov. 17, 1992

[54] OPTICAL RECORDING MEDIUM

[75] Inventors: Michihiro Kono, Sakura; Sadaaki Sigeta, Ageo; Hirokazu Takada, Sakura, all of Japan

[73] Assignees: Dainippon Ink and Chemicals Inc.; NKK Corporation, both of Tokyo, Japan

[21] Appl. No.: 546,760

[22] Filed: Jul. 2, 1990

[30] Foreign Application Priority Data

Jun. 30, 1989 [JP] Japan .................. 1-166535

[51] Int. Cl.⁵ .............. G03C 1/00; G03C 1/725
[52] U.S. Cl. ................. 430/495; 430/270; 430/945; 346/76 L
[58] Field of Search ............. 430/495, 945, 270; 346/76 L

[56] References Cited

U.S. PATENT DOCUMENTS

4,740,447  4/1988  Itoh et al. ................ 430/945
4,763,139  8/1988  Itoh et al. ................ 430/495
4,973,520  11/1990  Takada et al. ............. 428/412

*Primary Examiner*—Charles L. Bowers, Jr.
*Assistant Examiner*—Thorl Chea
*Attorney, Agent, or Firm*—Armstrong & Kubovcik

[57] ABSTRACT

An optical recording medium of the type whereby information is recorded and reproduced by utilizing a change of the reflectance of an irradiated portion, caused by irradiating a recording film formed on a substrate with laser beams is described. The recording film in this optical recording medium has a three-layer structure comprised of a layer containing at least tin and selenium and layers of a passive state-forming metal or an oxide thereof, contiguous to both sides of said layer containing tin and selenium. A film of a phthalocyanine compound having a light transmission of at least 80% at a wavelength of 770 to 850 nm is disposed between the recording film and the substrate.

9 Claims, 5 Drawing Sheets

THICKNESS OF Cu PHTHALOCYANINE FILM

OPTICAL RECORDING MEDIUM

BACKGROUND OF THE INVENTION

(1) Field of the Invention

The present invention relates to an optical recording material of the type in which a film of a metal, an organic coloring material or the like is formed on a substrate, the film is irradiated with laser beams, pits (holes) are formed in irradiated areas or a deformation or a phase change is caused in irradiated areas, and information is recorded and reproduced by utilizing a change of the reflectance in these areas.

(2) Description of the Related Art

In an optical recording medium of the pit-forming type, the recording film is irradiated with a laser beam modulated with an information signal, and the recording film is locally melted and evaporated by the thermal action of the laser beam to form a row of pits corresponding to the information signal. Since the reflectance of the recorded area wherein the row pits is thus formed is much different from the reflectance of the area wherein pits are not formed, reproduction is effected by utilizing this change of the reflectance.

Currently, a semiconductor laser is used as the laser light source for diminishing the size of the recording apparatus. The semiconductor laser is advantageous in that its size is small, its price is moderate and it is easily modulated, but its output is small and the short-wavelength oscillation required for high-density recording is impossible. Accordingly, to perform high-speed recording on an optical recording medium by using a small-size recording apparatus having a semiconductor laser mounted thereon, the recording medium must be a recording film having high sensitivity, i.e., a recording film on which pits having a good shape can be formed with a low power laser. To form such a recording film, the material of the recording film must have a low melting point and a low heat conductivity, and show an appropriate light absorption and an appropriate light reflectance at the oscillation wavelength (780 to 850 nm) of the semiconductor laser. In addition to these properties of the recording film, the surface tension of the melt of the recording film and the surface tension of the substrate on which the recording film is formed have a strong influence on the formation of pits. Accordingly, even if the same recording film is formed, the energy necessary for the formation of pits differs in accordance with the properties of the surface of the substrate on which the recording film is formed, and thus, the recording density or the shape the pits is often changed.

As the material of the recording film having properties required for attaining the above-mentioned recording characteristics, there can be mentioned films formed by vacuum evaporation deposition or sputtering of metals such as In, Ge, Sn, Pb, As, Sb, Bi, S, Se and Te, alloys thereof and composites of these metals with organic substances and oxides, and films formed by spin coating of organic coloring substances having a light absorption band in an oscillation wavelength region (780 to 850 nm) of the semiconductor laser.

Especially, films containing Sn as the main component, such as films of $Sn_xS_{100-x}$, $Sn_xBi_{100-x}$ and $Sn_xSe_{100-x}$ ($0<x<100$) can be optical recording films having a high sensitivity because the melting point is low and the light absorption and reflectance at oscillation wavelengths (780 to 850 nm) of a semiconductor laser are high. Moreover, the above-mentioned films comprising tin as the main component are stable against oxidation and have a strong durability. Furthermore, if layers of a passive state-forming metal are formed contiguously to both sides of the above-mentioned film comprising tin as the main component, these layers act as stable oxide protecting films, and the stability against the oxidation of the film comprising tin as the main component is further improved, and a formation of pinholes by pitting is controlled, with the result that any increase of the pit error rate with the lapse of time is controlled. Especially when $Sn_xSe_{100-x}$ ($0<x<100$) is used as the film substance comprising tin as the main component, an optical recording film having a high C/N ratio can be obtained and in which pits having a good shape can be formed.

In optical recording media of this type, the data transfer speed is low; about ½ of the data transfer speed in magnetic recording media such as magnetic tapes or magnetic disks. To eliminate this disadvantage, attempts have been made to increase the disk rotation speed to about 2,400 to about 3,600 rpm. To perform the recording at such a high speed while using a semiconductor laser having a low output, to reduce the price and size of the driving device for the optical recording medium, the sensitivity of the recording film must be further increased.

Attempts have been made to improve the recording sensitivity of the optical recording medium by forming a primer layer between the disk substrate and the recording film. As the primer layer, there are formed plasma films, sputtered films, vacuum evaporation deposition films, and spin coated films of various organic substances or organic substances containing a metal having a low melting point, and sputtered films of thermally decomposable metal oxides, nitrides or sulfides. As the organic substance used for formation of the above-mentioned primer layer, there are known fluorine-containing compounds such as hexafluoropropylene and tetrafluoroethylene, nitrogen-containing compounds such as acrylonitrile and propylamide, sulfur-containing compounds such as carbon disulfide, silicon-containing compounds such as hexamethyldisilane, saturated hydrocarbons such as methane and ethane, unsaturated hydrocarbons such as ethylene and acetylene, aromatic hydrocarbons such as benzene and styrene, and purine derivatives such as guanine and guanosine. Nevertheless, even in the optical recording medium having the above-mentioned primer layer formed between the conventional recording film and substrate, the recording sensitivity is still not high enough to allow recording at a rotation speed as high as 2,400 to 3,600 rpm.

SUMMARY OF THE INVENTION

An object of the present invention is to provide an optical recording medium comprising a substrate and, formed thereon, a recording film having layers of a passive state-forming metal or an oxide thereof formed contiguously to both sides of a layer containing at least tin and selenium, which has a recording sensitivity sufficient to allow recording at a high rotation speed (i.e., 2,400 to 3,600 rpm) while using a semiconductor laser having a small size and a small output.

In accordance with the present invention, there is provided an optical recording medium of the type whereby information is recorded and reproduced by utilizing a change of the reflectance of an irradiated portion, caused by irradiating a recording film formed on a substrate with laser beams, said optical recording medium being characterized in that the recording film has a three-layer structure comprising a layer containing at least tin and selenium and layers of a passive state-forming metal or an oxide thereof, contiguous to both sides of said layer containing tin and selenium, and a film of a phthalocyanine compound having a light transmission of at least 80% at a wavelength of 770 to 850 nm is disposed between the recording film and the substrate.

DESCRIPTION OF THE PREFERRED EMBODIMENTS

Figure 1:
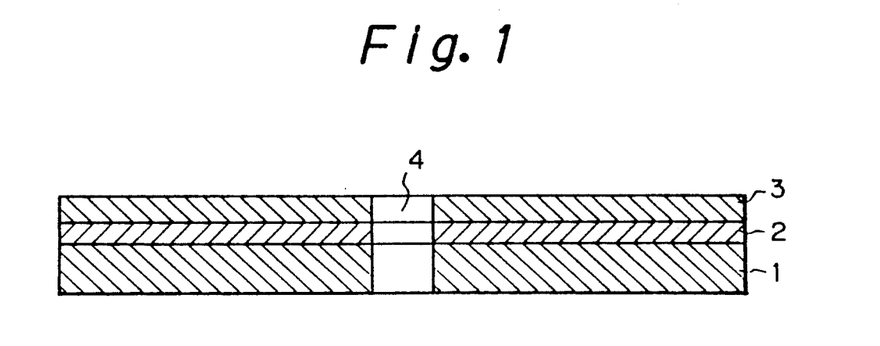
FIG. 1 is a sectional view illustrating the basic structure of the optical recording medium of the present invention.

FIG. 1 illustrates an example of the optical recording medium of the present invention. In FIG. 1, reference numeral 1 represents a disk-shaped substrate, reference numeral 2 represents a thin film composed of a phthalocyanine compound, reference numeral 3 represents a recording film, and reference 4 represents a through-hole. As the substrate 1, there can be used substrates composed of thermoplastic resins such as polycarbonate and polymethyl methacrylate, thermosetting resins including photocurable resins, such as epoxy resins, unsaturated polyester resins and polyfunctional acrylic resins, and glass. The surface of the glass substrate on the side where the recording film is formed can be composed of a thermosetting resin as mentioned above.

The film 2 composed of the phthalcyanine compound can be formed by customarily adopted film-forming methods, for example, a physical method such as vacuum evaporation deposition, sputtering, plasma polymerization or ion plating, or a coating method such as spin coating, dip coating, or doctor blading. The vacuum evaporation deposition method is especially preferable because a signal having a very good quality can be obtained upon recording and reproduction.

The thin film composed of a phthalocyanine compound according to the present invention has a light transmission of at least 80% at an oscillation wavelength of the semiconductor laser (780 to 850 nm). If this light transmission is lower than 80%, the quantity of laser beams passing through the substrate 1 and the film 2 of the phthalocyanine compound and arriving at the recording film 3 is often reduced, and thus the recording sensitivity is reduced. Phthalocyanine compounds such as vanadium phthalocyanine, lead phthalocyanine, titanyl phthalocyanine and tin phthalocyanine have a large light absorption at an oscillation wavelength (780 to 850 nm) of the semiconductor laser. Accordingly, when thin films having a light transmission of at least 80% at an oscillation wavelength (780 to 850 nm) of the semiconductor laser are formed by using these phthalocyanine compounds, the thickness must be reduced below 5 nm, and in practice, if a film having such a small thickness is disposed between the substrate 1 and the recording film 3, an optical recording medium having a high recording sensitivity cannot be formed.

If a film composed of a phthalocyanine compound having a large light absorption at an oscillative wavelength (780 to 850 nm) of the semiconductor laser, which has a thickness of at least 5 nm, is formed between the substrate 1 and the recording film 3, since the quantity of laser beams arriving at the recording film 3 is decreased, the laser power required for practically carrying out the recording is increased.

To form an optical recording medium having a high recording density, the light absorption of the used phthalocyanine compound at an oscillation wavelength (780 to 850 nm) of the semiconductor laser must be very small and the thickness of the formed film must be adjusted to an appropriate value. A film composed of magnesium phthalocyanine, which has a thickness of 1 to 100 nm, and a film composed of copper phthalocyanine, which has a thickness of 1 to 20 nm, are especially suitable. By forming a film of magnesium phthalocyanine or copper phthalocyanine having a thickness within the above-mentioned range between the substrate 1 and the recording film 3, an optical recording medium having a high recording sensitivity can be obtained.

Where a magnesium phthalocyanine film is formed between the substrate 1 and the recording film 3, the thickness at which an effect of improving the recording sensitivity is manifested is 1 to 100 nm, especially 2 to 50 nm, but the optimum thickness range of the magnesium phthalocyanine film varies according to the material of the surface of the substrate on which the recording film is formed and the thickness of the recording film. Even if the thickness of the magnesium phthalocyanine film is smaller than 1 nm, the recording sensitivity is improved compared to the level attained when the magnesium phthalocyanine film is not formed, but the effect is not satisfactory compared with the effect attained when the magnesium phthalocyanine film having an optimum thickness is formed. If the thickness of the magnesium phthalocyanine exceeds 100 nm, a formation of pits is explosively caused by a small laser power, and therefore, the pits become too large and the shape is not uniform. Accordingly, signal qualities, especially the C/N ratio, are degraded and in an extreme case, servo tracking is difficult.

Where a copper phthalocyanine film is formed between the substrate 1 and the recording film 3, the thickness of the copper phthalocyanine film at which the effect of improving the recording sensitivity is manifested is 1 to 20 nm, especially 2 to 10 nm. The optimum thickness range of the copper phthalocyanine varies according to the material of the surface of the substrate on which the recording film is formed and the thickness of the recording film. Even if the thickness of the copper phthalocyanine film is smaller than 1 nm, the recording sensitivity is improved compared to the level attained when the copper phthalocyanine film is not formed, but the effect is not satisfactory compared with the effect attained when a copper phthalocyanine film having an optimum thickness is formed. If the thickness of the copper phthalocyanine film exceeds 20 nm, a formation of pits is explosively caused by a small laser power, and therefore, the pits become too large and the shape is not uniform. Accordingly, the signal qualities, especially the C/N ratio, are degraded, and in an extreme case, servo tracking becomes difficult.

As pointed out hereinbefore, the recording sensitivity is improved if a film composed of a phthalocyanine compound such as magnesium phthalocyanine or copper phthalocyanine is formed between the substrate 1 and the recording film 3, and this effect is conspicuous when the material of the surface of the substrate is a thermosetting resin or glass. In an optical recording medium comprising a substrate, and formed thereon, a recording film having a layer containing at least tin and selenium and layers of a passive state-forming metal or an oxide thereof formed contiguously to both sides of this layer containing tin and selenium, if the material of the surface of the substrate on which the recording film is formed is a thermosetting resin or glass, the recording sensitivity tends to be lower than the recording density attained when the material of the surface of the substrate on which the recording film is formed is a thermoplastic resin. If a film composed of a phthalocyanine compound is formed between the above-mentioned recording film and the substrate, an optical recording medium having a high recording sensitivity can be obtained, even if the material of the surface of the substrate on which the recording film is formed is a thermosetting resin or glass. Namely, in an optical recording medium comprising a substrate, and formed thereon, a recording film comprising a layer containing at least tin and selenium and layers of a passive state-forming metal or an oxide thereof formed contiguously to the layer containing tin and selenium, the substrate selectivity of the recording film can be improved by forming a film composed of a phthalocyanine compound between the recording film and the substrate.

The recording film 3 has a structure in which layers of a passive state-forming metal or an oxide thereof are formed contiguously to both sides of a layer containing at least two elements of tin and selenium, and this film 3 is formed according to the customarily adopted physical film-forming process such as vacuum evaporation deposition, sputtering, plasma polymerization or ion plating. The atomic ratio between tin and selenium, i.e., x in the formula of $Sn_xSe_{100-x}$, is preferably in the range of $40 \leq x \leq 70$, and the thickness of the layer containing tin and selenium is preferably 5 to 60 nm. As the metal used for the passive state-forming metal layer, there can be mentioned Al, Ti, Cr, Co, Ni, Nb, Ta and Zr. Thereamong, Ti is especially preferable. Namely, if layers of Ti having a thickness of 0.5 to 4 nm are formed contiguously to a layer containing two elements of tin and selenium and having a composition of $Sn_xSe_{100-x}$ ($40 \leq x \leq 70$), a recording film having a high signal quality and stability with time can be obtained.

The present invention will now be described with reference to the following examples.

EXAMPLE 1

Guide grooves were formed on one surface of a plate composed of a polyvinyl ester resin by the photopolymerization (2P) process to form a disk substrate. A mixture of a polyurethane acrylate, ethylene glycol diacrylate and a photopolymerization initiator was used as the photopolymerizable resin. In this case, the material of the surface of the substrate was a thermosetting resin formed by radical polymerization of the photopolymerizable resin.

A magnesium phthalocyanine film was formed on the guide groove-formed surface of the substrate by the vacuum evaporation deposition. More specifically, the substrate was placed in a vacuum tank, and the interior of the vacuum tank was evacuated to an inner pressure of $2 \times 10^{-4}$ Pa and magnesium phthalocyanine charged in an alumina crucible was evaporated by resistance heating to form a magnesium phthalocyanine film having a thickness of 15 nm.

Subsequently, a recording film comprising Ti films formed on both sides of a layer composed of Sn and Se was formed on the magnesium phthalocyanine film-formed, guide groove-formed surface of the substrate by the sputtering method. More specifically, the substrate was placed in a vacuum tank, and the interior of the tank was evacuated to an inner pressure of $2 \times 10^{-4}$ Pa. Then, argon gas was introduced into the tank to produce a gas pressure of 0.5 Pa, a Ti film having a thickness of 1.5 nm was formed by the DC magnetron sputtering method, and an SnSe film having a thickness of 15 nm was formed thereon according to the RF magnetron sputtering method. Then, a Ti film having a thickness of 1.5 nm was formed in the same manner as described above.

The obtained recording medium was attached to a recording and reproducing apparatus and the recording-reproducing test was carried out by using semiconductor laser beams having a wavelength of 830 nm under conditions of a recording frequency of 9 MHz, a linear speed of 18 m/sec (CAV 3,000 rpm) and a regenerating laser power of 1 mW. The relationship between the C/N ratio at a band width of 30 KHz and the recording laser power was examined. It was found that a C/N ratio of higher than 50 dB was obtained at a recording laser power larger than 6.5 mW.

EXAMPLE 2

The experiment was carried out in the same manner as described in Example 1 except that a copper phthalocyanine having a thickness of 5 nm was formed instead of the magnesium phthalocyanine film formed in Example 1. It was found that a C/N ratio of higher than 50 dB was obtained at a recording laser power larger than 6.5 mW.

EXAMPLE 3

The experiment was carried out in the same manner as described in Example 1 except that a glass substrate having grooves formed by the etching method was used instead of the substrate used in Example 1. The thickness of the magnesium phthalocyanine film was changed to 20 nm, but the thickness of the recording film was the same as in Example 1. It was found that a C/N ratio of higher than 50 dB was obtained at a recording laser power larger than 7.0 mW.

EXAMPLE 4

The experiment was carried out in the same manner as described in Example 1 except that a substrate having guide grooves formed on one side, which was prepared by the injection molding of a polycarbonate resin, was used instead of the substrate used in Example 1. The thickness of the magnesium phthalocyanine film was changed to 30 nm but the thickness of the recording film was the same as in Example 1. It was found that a C/N ratio of higher than 50 dB was obtained at a recording laser power larger than 7.5 mW.

EXAMPLE 5

The experiment was carried out in the same manner as described in Example 4 except a copper phthalocyanine film having a thickness of 10 nm was used instead of the magnesium phthalocyanine film used in Example 4. It was found that a C/N ratio of higher than 50 dB was obtained at a recording laser power larger than 8.0 mW.

EXAMPLE 6

Samples having a different thickness of the magnesium phthalocyanine film were prepared, and the influence of the thickness of the magnesium phthalocyanine film on the recording characteristics was examined. The methods of forming the magnesium phthalocyanine film and recording film and the recording-reproducing experiment method were the same as described in Example 1. The relationship between the thickness of the magnesium phthalocyanine film and the recording power at which the C/N ratio was higher than 50 dB is shown in FIGS. 2 and 3.

Figure 2:
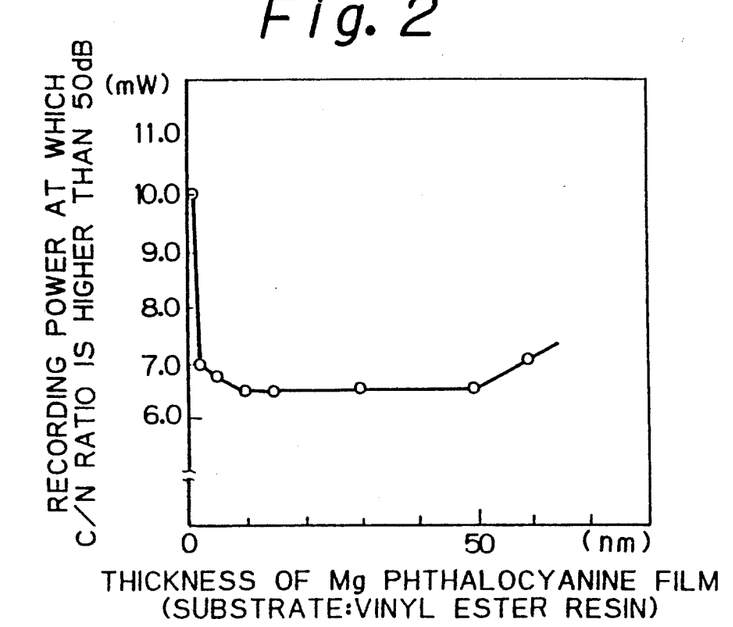
FIGS. 2 and 3 are diagrams illustrating the relationship between the thickness of the magnesium phthalocyanine film in the optical recording medium of the present invention and the recording power at which the C/N ratio is higher than 50 dB.
Figure 3:
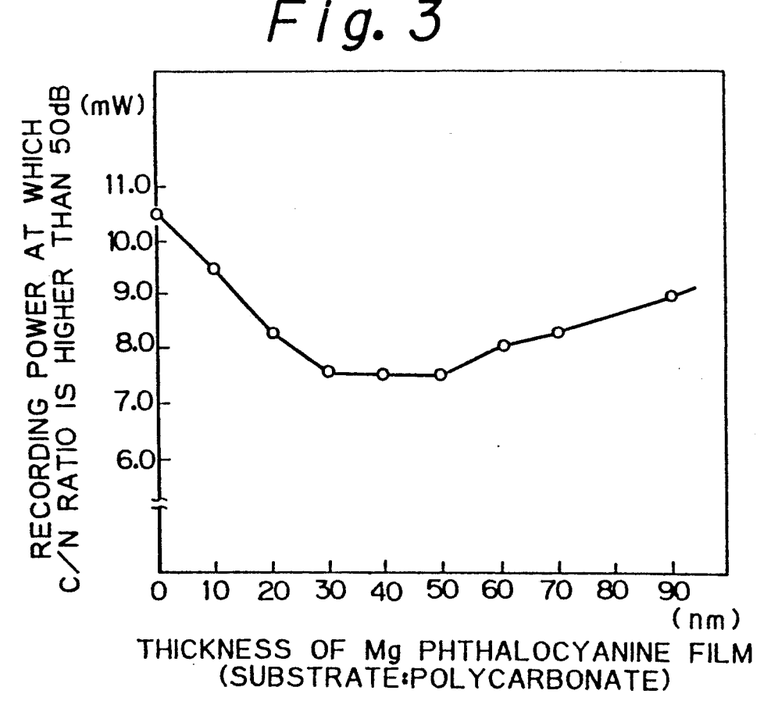

FIG. 2 shows the results obtained when a disk substrate obtained by forming guide grooves on a plate of a polyvinyl ester type resin by the 2P method was used, and FIG. 3 shows the results obtained when a disk substrate having guide grooves formed on one side thereof, which was obtained by the injection molding of a polycarbonate resin, was used. As is apparent from these results, the thickness of the magnesium phthalocyanine film suitable for the improvement of the recording sensitivity differs according to the kind of the substrate used, even if the recording film is the same. Where the material of the substrate is a thermosetting resin, the effect of improving the recording sensitivity is high even if the thickness of the magnesium phthalocyanine film is as small as 2 nm. In the case of the polycarbonate resin substrate, the recording sensitivity is high when the thickness of the magnesium phthalocyanine is 30 to 50 nm.

Figure 5:
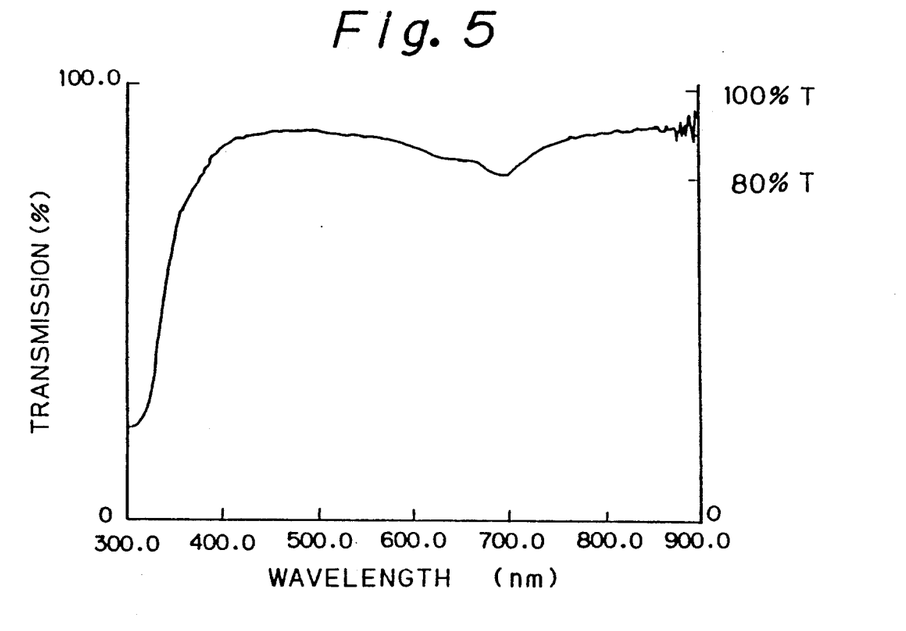
FIGS. 5 and 6 show the light transmission spectrum of the magnesium phthalocyanine film formed on the polycarbonate resin substrate by the vacuum evaporation deposition method.
Figure 6:
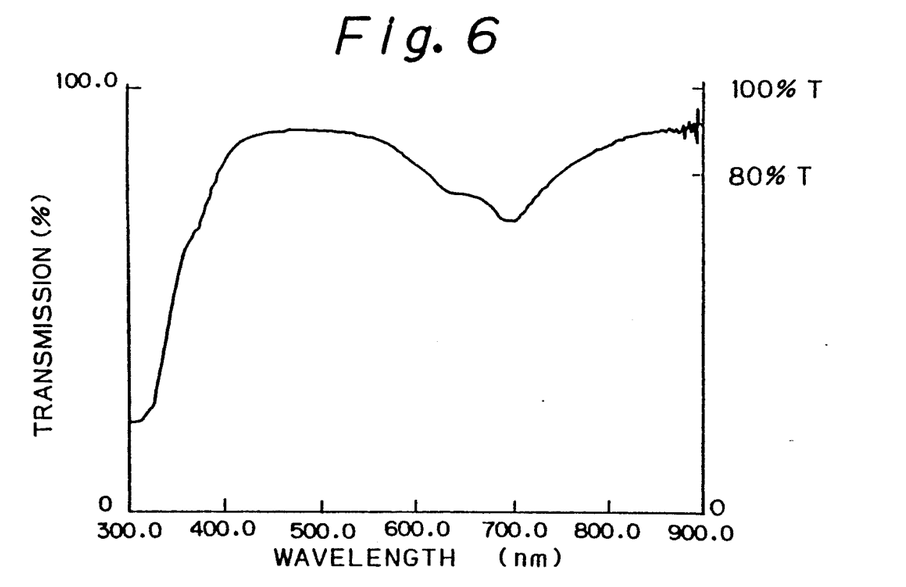

FIGS. 5 and 6 show specific examples of light transmission spectrum of the magnesium phthalocyanine film formed on the polycarbonate resin substrate by the vacuum evaporation deposition. FIG. 5 shows the light transmission spectrum of the magnesium phthalocyanine film having a thickness of 10 nm, and FIG. 6 shows the light transmission spectrum of the magnesium phthalocyanine film having a thickness of 100 nm. As seen from these results, even in the case of the magnesium phthalocyanine film having a thickness of 100 nm, the light transmittance is at least 80% at a wavelength of 770 to 850 nm.

EXAMPLE 7

Figure 4:
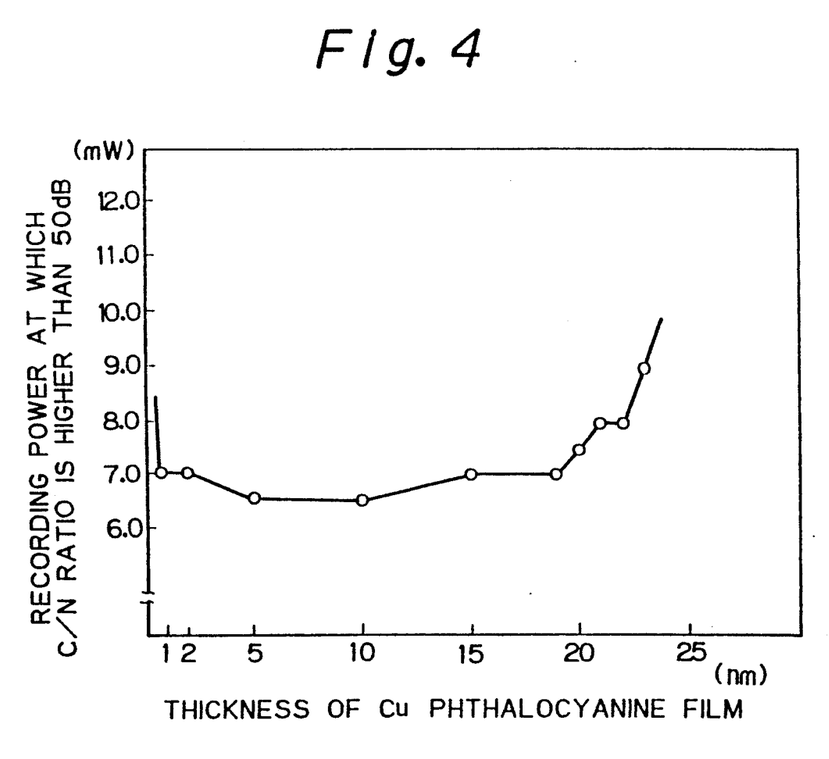
FIG. 4 is a diagram illustrating the relationship between the thickness of the copper phthalocyanine film in the optical recording medium of the present invention and the recording power at which the C/N ratio is higher than 50 dB.

Samples having a different thickness of the copper phthalocyanine film were prepared, and the influence of the thickness of the copper phthalocyanine on the recording characteristics was examined. The substrate used, the methods of forming the copper phthalocyanine film and recording film, and the recording-reproducing experiment method were the same as described in Example 1. The relationship between the thickness of the copper phthalocyanine film and the recording power at which the C/N ratio was higher than 50 dB is shown in FIG. 4.

Figure 7:
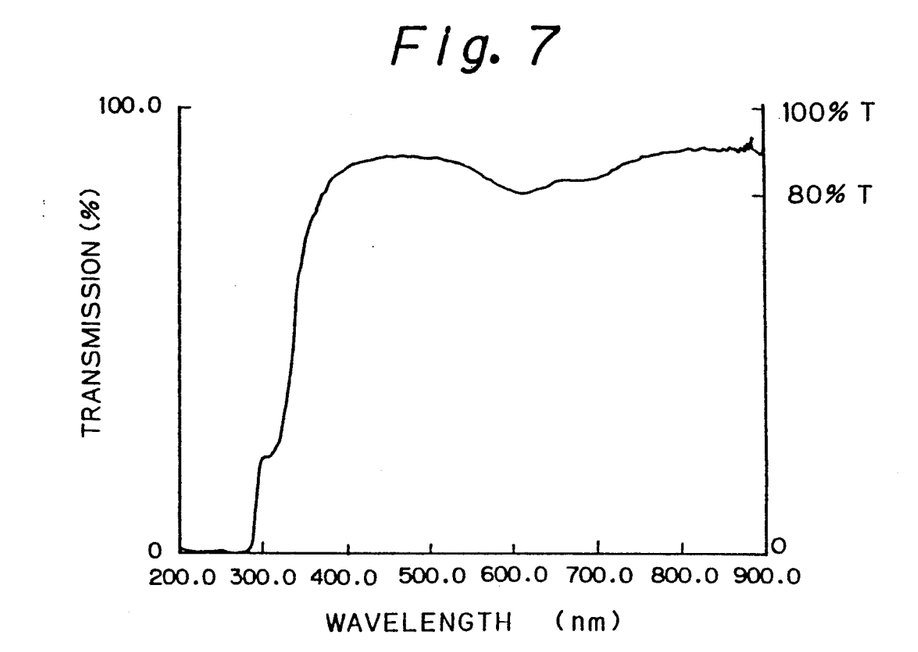
FIGS. 7 and 8 show the light transmission spectrum of the copper phthalocyanine film formed on the polycarbonate resin substrate by the vacuum evaporation deposition method.
Figure 8:
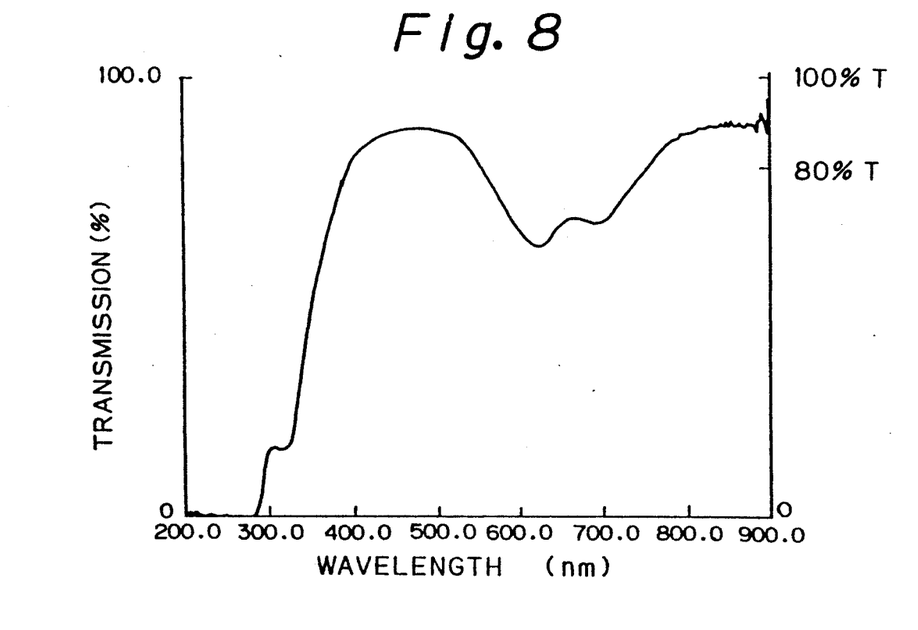

FIGS. 7 and 8 show specific examples of the light transmission spectrum of the copper phthalocyanine film formed on the polycarbonate resin substrate by the vacuum evaporation deposition method. FIG. 7 shows the light transmission spectrum of the copper phthalocyanine film having a thickness of 10 nm, and FIG. 8 shows the light transmission spectrum of the copper phthalocyanine film having a thickness of 100 nm. As apparent from these results, even in the case of the copper phthalocyanine film having a thickness of 100 nm, the light transmission is higher than 80% at a wavelength of 770 to 850 nm, but if the film thickness is larger than 20 nm, an explosive formation of pits occurs, and the pits become too large.

COMPARATIVE EXAMPLES 1, 2 AND 3

In each of Examples 1, 3 and 4, an optical recording medium having no magnesium phthalocyanine film formed between the substrate and the recording film was prepared, and the recording-reproducing experiment was carried out under the same conditions as described in Example 1. In Comparative Examples 1 and 2, even if the recording laser power was changed in the range of 1 to 15 mW, good recording pits giving a C/N ratio of higher than 50 dB could not be formed. In Comparative Example 3, a C/N ratio of higher than 50 dB was obtained at a recording laser higher than 10.5 mW. The results of the recording-reproducing experiment obtained in Examples 1 through 5 and Comparative Examples 1 through 3 are collectively shown in Table 1.

COMPARATIVE EXAMPLE 4

An optical recording medium was prepared in the same manner as described in Example 4 except a vanadyl phthalocyanine film having a thickness of 10 nm was formed instead of the magnesium phthalocyanine film formed in Example 4, and the recording-reproducing experiment was carried out under the same conditions as adopted in Example 4. It was found that a C/N ratio of higher than 50 dB was obtained at a recording laser power higher than 10.5 mW.

COMPARATIVE EXAMPLE 5

An optical recording medium was prepared in the same manner as described in Example 4 except that a lead phthalocyanine film having a thickness of 10 nm was formed instead of the magnesium phthalocyanine film formed in Example 4, and the recording/reproducing test was carried out under the same conditions as adopted in Example 1. It was found that a C/N ratio of higher than 50 dB was obtained at a recording laser power higher than 11.0 mW.

COMPARATIVE EXAMPLE 6

An optical recording medium was prepared in the same manner as described in Example 4 except that a titanyl phthalocyanine film having a thickness of 15 nm was formed instead of the magnesium phthalocyanine film formed in Example 4, and the recording-reproducing experiment was carried out under the same conditions as adopted in Example 1. It was found that a C/N ratio of higher than 50 dB was obtained at a recording laser power higher than 11.0 mW.

TABLE 1

| Example No. | Material of surface of disk substrate | Phthalocyanine compound and amount thereof | Recording power (mW) at which C/N ratio is at least 50 dB |
| --- | --- | --- | --- |
| Example 1 | Thermosetting resin | Mg phthalocyanine (15 nm) | 6.5 |
| Example 2 | Thermosetting resin | Cu phthalocyanine (5 nm) | 6.5 |
| Example 3 | Glass | Mg phthalocyanine (20 nm) | 7.0 |
| Example 4 | Polycarbonate | Mg phthalocyanine (30 nm) | 7.5 |
| Example 5 | Polycarbonate | Cu phthalocyanine (10 nm) | 8.0 |
| Comparative Example 1 | Thermosetting resin | — | Recording Impossible |
| Comparative Example 2 | Glass | — | Recording impossible |
| Comparative Example 3 | Polycarbonate | — | 10.5 |
| Comparative Example 4 | Polycarbonate | VO phthalocyanine (15 nm) | 10.5 |
| Comparative Example 5 | Polycarbonate | Pb phthalocyanine (15 nm) | 11.0 |
| Comparative Example 6 | Polycarbonate | TiO phthalocyanine (15 nm) | 11.0 |

Figure 9:
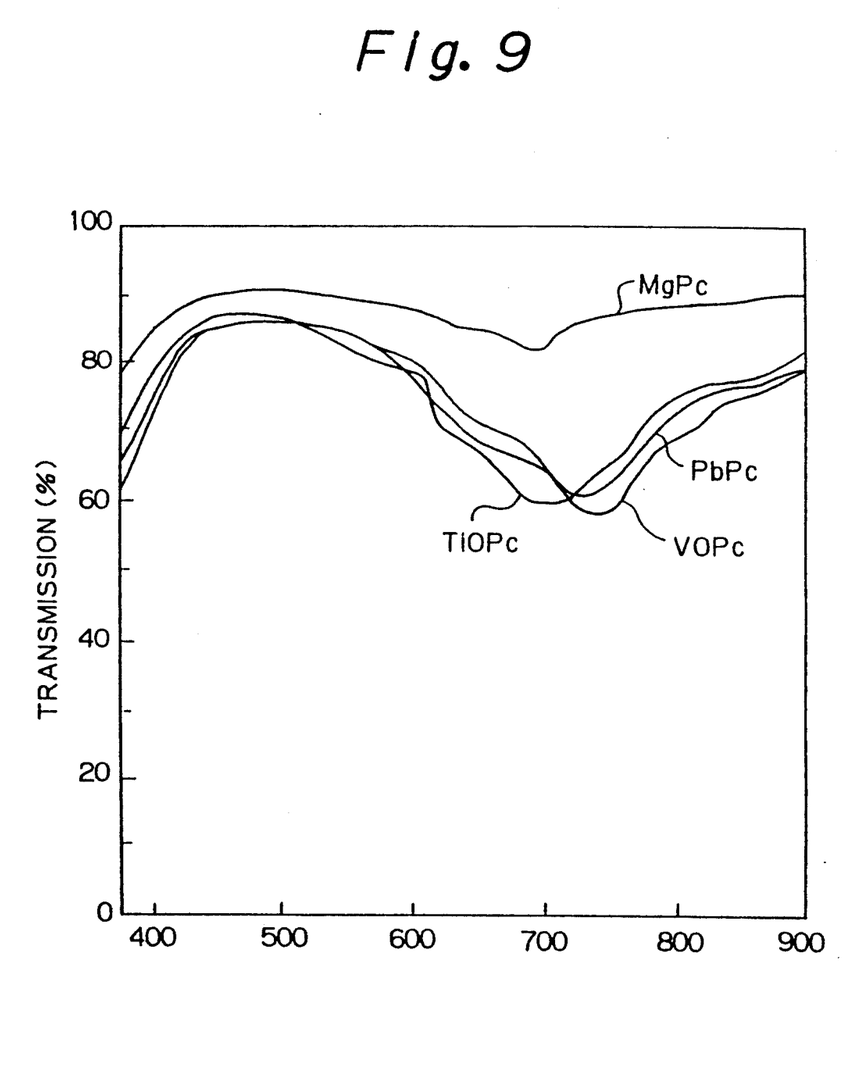
FIG. 9 is a diagram illustrating light transmission spectra of films of various phthalocyanine compounds.

With respect to films of phthalocyanine compounds shown below, the relationship between the light transmission and the recording power at which the C/N ratio was higher than 50 dB were determined. The results are shown in FIG. 9, and the light mission at a wavelength of 830 nm and the recording power at which the C/N ratio was higher than 50 dB are shown in Table 2. In these experiments, the phthalocyanine compound films were formed by the vacuum evaporation deposition method, and a polycarbonate resin substrate was used as the substrate.

TABLE 2

| Phthalocyanine compound | Film thickness (nm) | Light transmission (%) at 830 nm | Recording power (mW) at which C/N Ratio is at least 50 dB |
| --- | --- | --- | --- |
| Mg phthalocyanine | 30 | 90 | 7.5 |
| VO phthalocyanine | 30 | 73 | 11.5 |
| Pb phthalocyanine | 30 | 76 | 12.0 |
| TiO phthalocyanine | 30 | 77 | 12.0 |

According to the present invention, by forming a film of a phthalocyanine compound having a light transmission of at least 80% at a wavelength of 770 to 850 nm between a substrate and a recording film comprising a layer containing at least tin and selenium and layers of a passive state-forming metal or an oxide thereof formed on both sides of the layer containing tin and selenium, the recording sensitivity can be drastically improved without adverse influence on other properties, and there can be provided an optical recording medium having a recording sensitivity sufficient to allow the recording at a high rotation speed (2,400 to 3,600 rpm) while using a semiconductor laser having a small size and a small output.

We claim:

1. An optical recording medium of the type whereby information is recorded and reproduced by utilizing a change of the reflectance of an irradiated portion, caused by irradiating a recording film formed on a substrate with laser beams, said optical recording medium being characterized in that the recording film has a three-layer structure comprising a layer containing at least tin and selenium and layers of a passive state-forming metal or an oxide thereof, contiguous to both sides of said layer containing tin and selenium, and a film of a phthalocyanine compound having a light transmission of at least 80% at a wavelength of 770 to 850 nm is disposed between the recording film and the substrate.

2. An optical recording medium according to claim 1, wherein the film of the phthalocyanine compound is composed of magnesium phthalocyanine and has a thickness of 1 to 100 nm.

3. An optical recording medium according to claim 2, wherein the film of magnesium phthalocyanine has a thickness of 2 to 50 nm.

4. An optical recording medium according to claim 1, wherein the film of the phthalocyanine compound is composed of copper phthalocyanine and has a thickness of 1 to 20 nm.

5. An optical recording medium according to claim 4, wherein the film of copper phthalocyanine has a thickness of 2 to 10 nm.

6. An optical recording medium according to claim 1, wherein the material of the surface of the substrate is a thermosetting resin or glass.

7. An optical recording medium according to claim 1, wherein the layer containing tin and selenium is comprised of 40 to 70 atomic % of tin and 30 to 60 atomic % of selenium and has a thickness of 5 to 60 nm.

8. An optical recording medium according to claim 1, wherein the passive state-forming metal is selected from the group consisting of aluminum, titanium, chromium, cobalt, nickel, niobium, tantalum and zirconium.

9. An optical recording medium according to claim 7, wherein the passive state-forming metal is titanium and each layer of titanium or a titanium oxide has a thickness of 0.5 to 4 nm.

* * * * *